(12) United States Patent
Sicley

(10) Patent No.: US 7,285,180 B2
(45) Date of Patent: Oct. 23, 2007

(54) PERFORATED DECK MADE OUT OF A PLURALITY OF SEGMENTS

(75) Inventor: David L. Sicley, Merrimack, NH (US)

(73) Assignee: GL&V Management Hungary Kft., Budapest (HU)

( * ) Notice: Subject to any disclaimer, the term of this patent is extended or adjusted under 35 U.S.C. 154(b) by 585 days.

(21) Appl. No.: 10/827,477

(22) Filed: Apr. 19, 2004

(65) Prior Publication Data

US 2005/0230306 A1    Oct. 20, 2005

(51) Int. Cl.
  *D21D 5/06*    (2006.01)
  *D21F 1/74*    (2006.01)
(52) U.S. Cl. ............... 162/55; 162/357; 210/410; 210/784
(58) Field of Classification Search .......... 162/56, 162/60, 205, 232, 358.1, 367, 368, 373, 374, 162/382, 384, 318, 321, 323, 357, 55; 100/118, 100/121, 37; 210/784, 402–404; 492/20, 492/38
See application file for complete search history.

(56) References Cited

U.S. PATENT DOCUMENTS

| | | | | |
|---|---|---|---|---|
| 3,175,691 A | * | 3/1965 | Watson | 210/404 |
| 3,225,935 A | | 12/1965 | Porteous | 210/404 |
| 3,238,866 A | | 3/1966 | Strindlund | 100/90 |
| 3,306,457 A | * | 2/1967 | Putnam | 210/330 |
| 3,429,256 A | * | 2/1969 | Bailleau | 100/121 |
| 3,680,708 A | | 8/1972 | Luthi | 210/479 |
| 3,794,178 A | * | 2/1974 | Luthi | 210/404 |
| 3,837,499 A | * | 9/1974 | Luthi | 210/404 |
| 3,969,802 A | | 7/1976 | Bouvet | 29/121 |
| 4,561,156 A | * | 12/1985 | Sun | 241/294 |
| 5,253,816 A | * | 10/1993 | Kastingschafer et al. | 241/227 |
| 5,385,309 A | * | 1/1995 | Bielagus | 241/235 |
| 5,470,471 A | | 11/1995 | Luthi et al. | 210/386 |
| 5,667,642 A | | 9/1997 | Luthi | 162/358.1 |
| 5,690,300 A | * | 11/1997 | Iannucci | 242/571.2 |
| 5,791,495 A | | 8/1998 | Gero et al. | 209/395 |
| 5,902,456 A | | 5/1999 | Sundqvist et al. | 162/358.1 |
| 6,311,849 B1 | | 11/2001 | Sbaschnigg et al. | 210/404 |
| 6,454,687 B1 | | 9/2002 | Mattsson | 492/45 |
| 6,461,505 B1 | | 10/2002 | Danielsson et al. | 210/248 |
| 6,660,161 B2 | | 12/2003 | Danielsson et al. | 210/326 |
| 6,792,859 B2 | * | 9/2004 | Fukui et al. | 101/378 |

* cited by examiner

*Primary Examiner*—Eric Hug
(74) *Attorney, Agent, or Firm*—James Earl Lowe, Jr.

(57) ABSTRACT

A cylindrical rotating thickening device including an axial core, a plurality of longitudinally extending spaced apart support ribs extending radially from the axial core, and a shell surrounding the support ribs and supported thereon. The shell includes a plurality of longitudinally extending spaced apart grooves, and a perforated deck surrounding and supported on the shell. The deck includes a plurality of closely adjacent deck segments, and each deck segment includes a leading edge and a trailing edge. Each deck segment further includes an integral bar attached to the leading edge and received in the shell groove, and a plurality of fasteners for securing the bar to the shell.

8 Claims, 4 Drawing Sheets

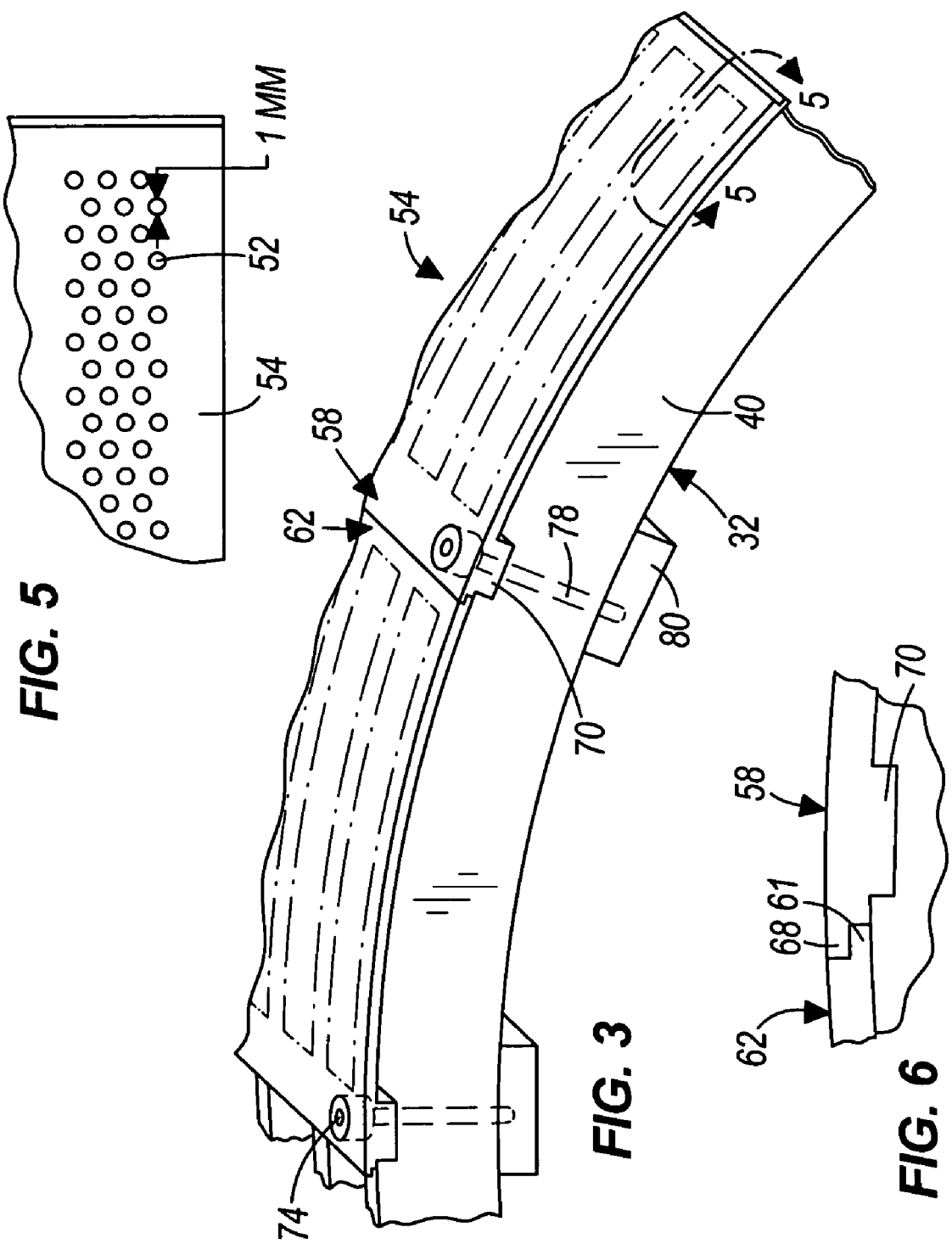

PERFORATED DECK MADE OUT OF A PLURALITY OF SEGMENTS

BACKGROUND OF THE INVENTION

This invention is directed to cylindrical, rotating thickening device, and, more particularly, to a perforated deck on such a cylindrical rotating thickening device.

During operation, the perforated decking of a press roll must transfer the high loads generated at the nip between rolls and at the roll periphery to the main shell of the roll. Current technology uses shrink fitting or welding of continuous hoops of perforated decking to the shell, to transfer these loads from the cylindrical hoops of perforated deck plate to the main shell of the press roll. Since the cylindrical deck hoops are a continuous ring secured to the roll shell, it is very difficult to replace the deck without removing the roll from the machine. Further, removing such a deck, even when the roll is removed from the machine, is very costly.

Twin roll presses have been used for many years to separate liquids and solids. In the pulp & paper industry, pulp slurry is separated into filtrate and pulp fibers. In the municipal waste industry, sludge is dewatered. In the agricultural and food processing industry, vegetable, fruit and grains are separated into juice and fiber. Twin roll presses consist of two press rolls that are cylindrical in shape and of any diameter and length. The press rolls are typically made of various metals. The surface of the press rolls includes a perforated deck to aid in the pressing and filtering process. In a pulp mill application, the press rolls are horizontally immersed, side-by-side, in pulp slurry contained in a pressurized vat. The rolls are counter rotating with respect to each other. As the periphery of the rolls rotates into the vat, a mat begins to form on the deck plate due to the drainage of the liquid through the perforations in the deck plate. The mat continues to build and liquid continues to drain as it flows from the pressurized vat to the atmospheric channels inside the roll. The roll and pulp mat continue rotating to a nip formed by the two rolls where the pulp mat is squeezed to remove more of the remaining liquid. The dewatered pulp fibers are then doctored off the rolls and transferred out of the press vat by a conveyor.

Typically, the press rolls include an axial core upon which there is an array of longitudinal extending spaced apart support ribs. These longitudinal ribs support a shell at the outer edges of the ribs. There are several designs of shells at this time. Typical shells are either of a heavy walled hollow cylinder with circumferential grooves, with radial holes, and lands, or of a series of individual ribs spaced apart to form spaces and lands. In both types of shell, it is the lands or ribs that support the perforated deck, and the grooves with holes or the spaces between the ribs, allow for the passage of the liquid to the interior of the press roll where it is then drained away.

SUMMARY OF THE INVENTION

This invention uses a new method to attach the deck plate to the roll, and to transfer the loads from the deck plate to the roll shell. This invention also allows for easier replacement of the deck, as well as permitting for replacement of the deck without removing the press roll from the roll press. It also allows for thermal expansion of each deck section.

The replaceable perforated deck of this invention is an apparatus that is installed on the outside diameter of the press roll shell. It is used to aid in dewatering and filtering the slurry, be it pulp, sludge or agricultural products. It can be used in up flowing presses or down flowing presses. The deck is made in longitudinal sections or segments that include a longitudinal bar or key that seats into a mating groove in the press roll shell. The longitudinal bar or key can be of various cross sections, i.e., square, round, rectangular, etc. The deck plate is relatively thin, and cannot itself handle the large loads placed on the press roll. The perforated deck bar can carry these loads without affecting the remainder of the plate.

The main feature of this longitudinal deck is the bar section, that transfers the high tangential loads between the perforated deck plate to the edge of the ribs in the longitudinal grooves in the press roll shell. Because of this bar, longitudinal decks can be attached with fasteners or welds along the length of the deck to keep it in place. Individual deck sections can then be easily replaced with out removing the press rolls, which is a great advantage over the current technology.

These longitudinal decks can be installed on new press rolls as well as retrofitted onto existing press rolls.

More particularly, this invention provides a cylindrical rotating thickening device including an axial core, a plurality of longitudinally extending spaced apart support ribs extending radially from the axial core, and a shell surrounding the support ribs and supported thereon. The shell includes a plurality of longitudinally extending spaced apart grooves, and a perforated deck surrounding and supported on the shell. The deck includes a plurality of closely adjacent deck segments, and each deck segment includes a leading edge and a trailing edge. Each deck segment further includes an integral bar attached to the leading edge and received in the shell groove, and a plurality of fasteners for securing the bar to the shell.

BRIEF DESCRIPTION OF THE DRAWINGS

FIG. 3 is an enlarged, partial cross-sectional view of part of the press roll of FIG. 2.

FIG. 5 is an enlarged, partial view of the press roll of FIG. 4, illustrating the perforation hole pattern and size.

FIG. 6 is an enlarged, partial cross-sectional view of the press roll of FIG. 3, illustrating how the shell groove, bar, deck segment leading edge and deck segment trailing edge interact.

Figure 1:
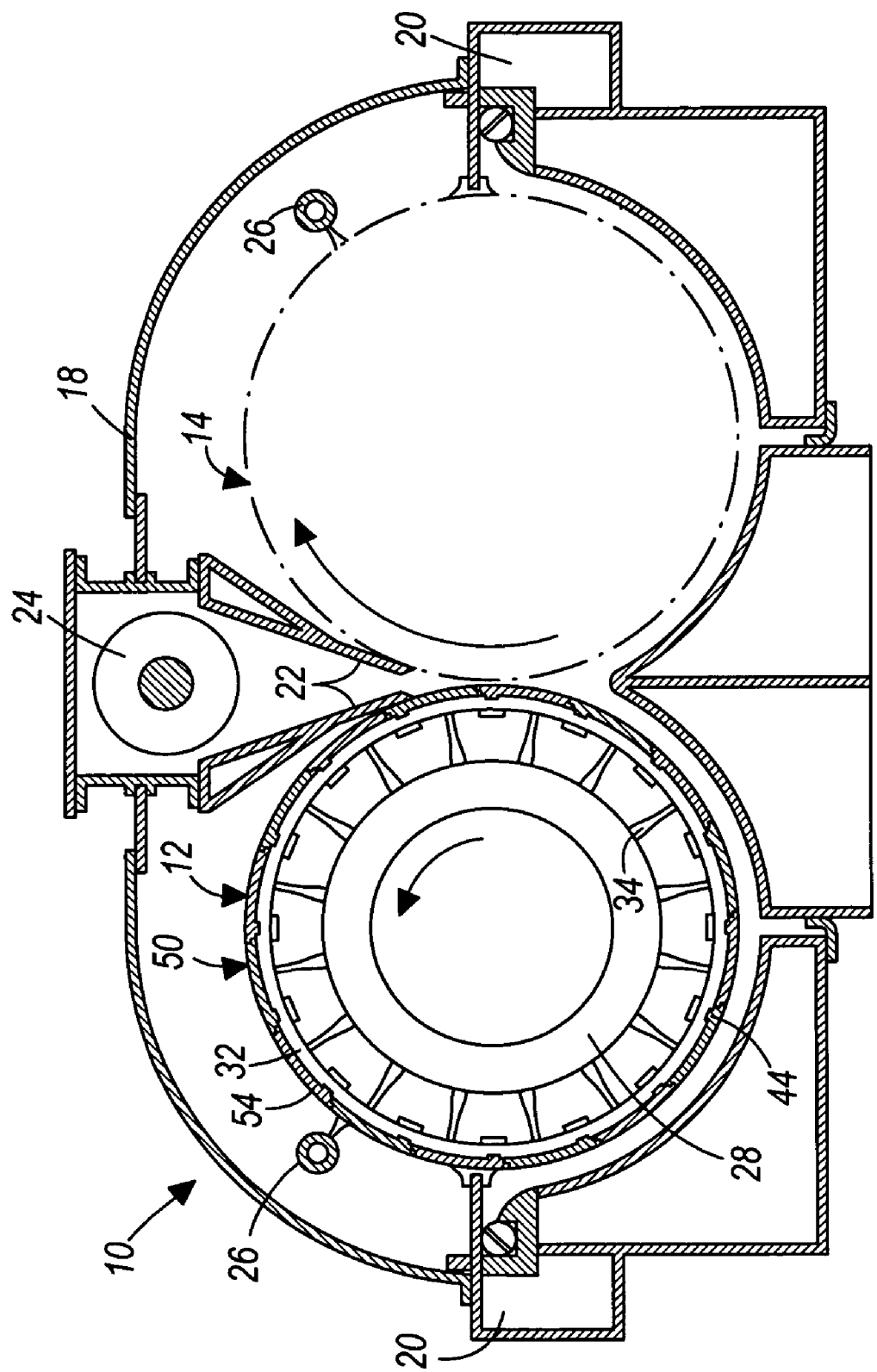
FIG. 1 is a schematic, cross sectional side view, of a twin roll press, showing on the left, the detail of a roll of this invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

FIG. 1 depicts a twin roll press 10 with two press rolls 12 and 14. Although a roll press is depicted, this invention is equally applicable to other cylindrical rotating thickening devices, such as drum washers, including pressure washers and pulp sheet formers. Roll 12 is shown in cross-section, and roll 14 only as a circular component; it is to be understood, however, that rolls 12 and 14 are identical, although in other embodiments (not shown), the rolls can be of different constructions. The rolls 12 and 14 are rotatably journalled in a housing 18. As viewed in FIG. 1, the roll 12 rotates counterclockwise and the roll 14 rotates clockwise.

At each side of the housing are pulp slurry inlet boxes 20. Also, mounted within the housing 18 are doctors 22 for extracting a pulp mat from the rolls 12 and 14 and guiding the mat to a conveyor 24. Cleaning showerheads 26 are disposed, in the housing 18, at a location just prior (with respect to the rotary direction of the rolls) to the inlet boxes 20. The press roll 12 also includes a steel shaft or core 28. A stainless steel shell or drum 32 is carried on the shaft 28 by means of sixteen (in this example) support ribs 34.

Still more particularly, as illustrated in FIG. 1, the invention provides the press roll 12, including the axial core 28, and the longitudinally extending spaced apart support ribs 34 that extend radially from the axial core 28. In still other embodiments (not shown), means other than the ribs 34 can be used to support the shell around the core.

Figure 4:
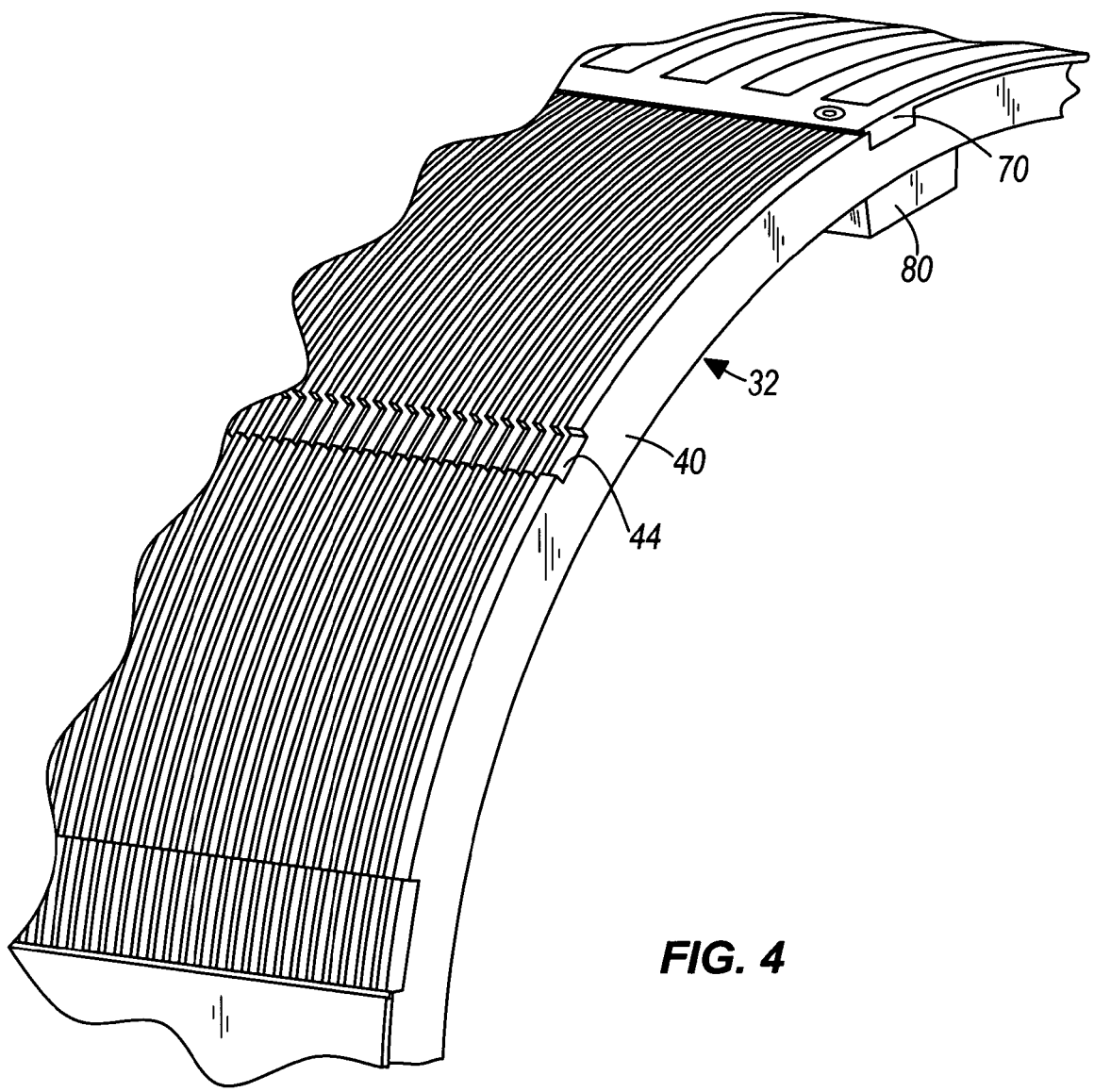
FIG. 4 is an enlarged, partial cross-sectional view of the press roll of FIG. 3, with several deck segments removed.

The press roll 12 further includes the shell 32 that surrounds the support ribs and is supported thereon. As is conventional, the shell 32 is made up of a plurality of spaced apart rings 40 heat shrunk or welded onto the support ribs (best shown in FIG. 4). In other embodiments (not shown), the shell 32 can be a continuous cylinder including grooves and holes to permit the pulp liquid to pass through the shell and into the interior of the press roll. And although, in this preferred embodiment the press roll is shown used in an up flowing press, it can also be used in a down flowing press.

Still more particularly, the shell 32 includes on its outer surface a plurality of longitudinally extending spaced-apart grooves 44 (the purpose of which will be apparent below), and the press roll 12 further includes a deck 50 surrounding and supported on the shell 32. The deck 50 is perforated with holes 52. The deck 50 includes a plurality of deck segments 54, each deck segment 54 including a leading edge 58 and a trailing edge 62, as best seen in FIG. 3.

Figure 2:
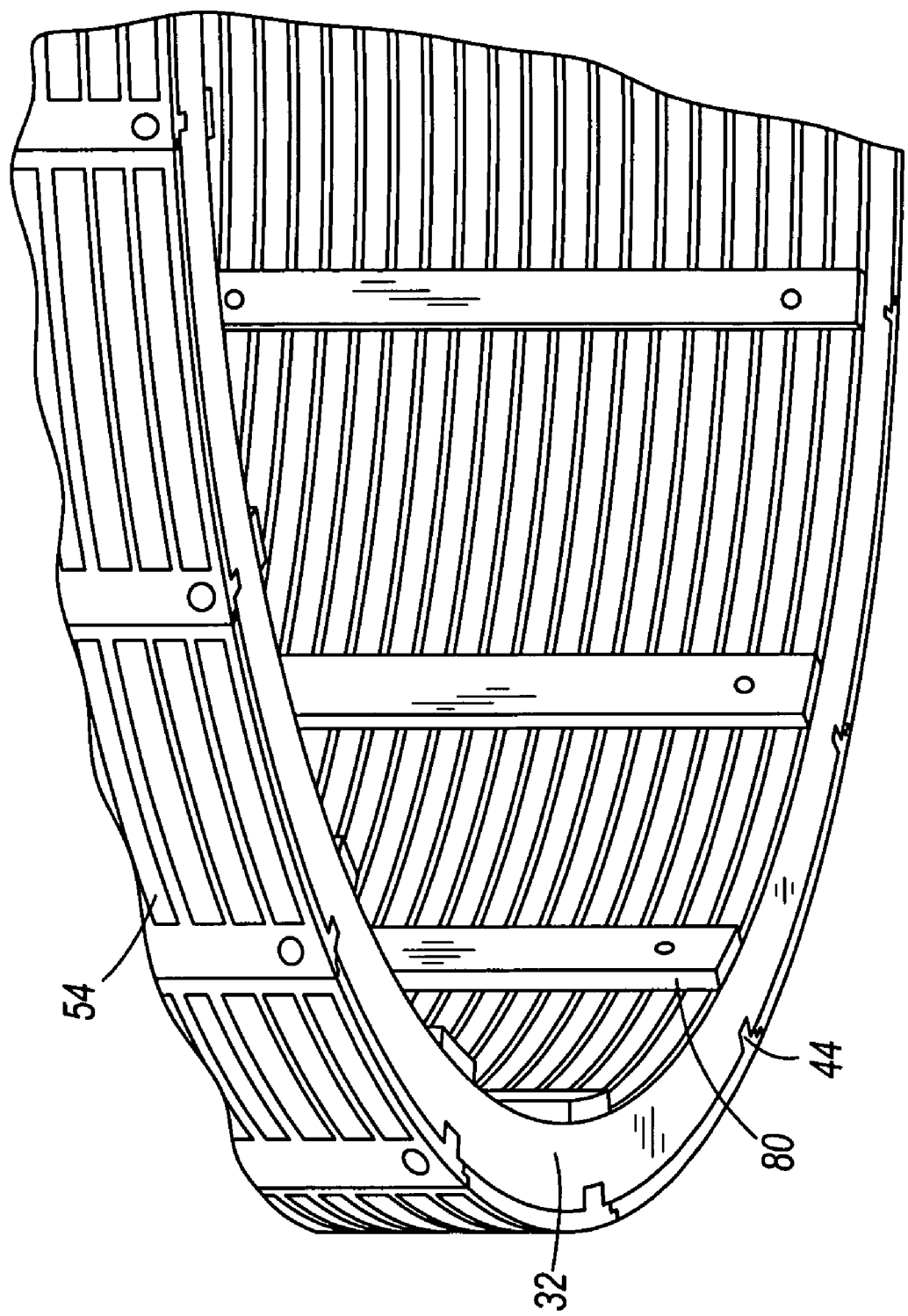
FIG. 2 is an enlarged, partial cross-sectional view of one of the press rolls of FIG. 1.

The deck segments 54 are closely adjacent to each other in the shell circumferential direction, and serve to cover the entire shell 32 and form the surface that interacts with the pulp mat on the press roll 12. Preferably, each deck segment 54 extends the entire length of the press roll 12, but each deck segment 54 can be made in further longitudinal segments if needed to aid in assembly of the deck 50. More particularly, as shown in FIGS. 2, 3 and 6, the trailing edge 62 of each deck segment 54 is held against the shell by its following deck segment leading edge 58. Still more particularly, the trailing edge 62 has a shelf 61 that is clamped under a lip 68 formed on the next deck segment leading edge. A sufficient gap is left between the deck segment trailing edge and the next leading edge to permit for heat expansion of the deck segment.

Each deck segment 54 further includes a bar 70 attached to the leading edge 58 and received in its respective shell groove 44, and means for securing the leading edge 58 to the bar 70. The depth of each groove 44 is such that the groove permits each bar 70 to be recessed sufficiently to permit the deck segment 54 to lie in contact with the shell 32. More particularly, in the preferred embodiment, the bar 70 is integral with the bar leading edge 58. In other less preferred embodiments (not shown), the bar can be attached to the leading edge by other means, such as by welding or by fasteners.

The press roll 12 further includes means for securing the bar 70 to the shell 32. More particularly, as best shown in FIG. 3, the leading edge 58 and bar 70 include mounting openings 74 therein for receiving a fastener 78. The fastener 78 passes through the openings 74 and between the hoops 40 of the shell 32, and is secured to a clamping bar 80 inside the shell 32. When the shell is a solid cylinder (not shown), the fastener can be secured in a mounting hole in the shell, and the clamping bar can be omitted. In still other embodiments (not shown), each bar can be secured by welds. In the preferred embodiment, the bar 70 is rectangular in cross section, and each of the shell grooves 44 is rectangular in cross section. In other embodiments (not shown), other bar shapes, and corresponding groove shapes, can be used.

Various other features and advantages of the invention will be apparent from the following claims.

The invention claimed is:

1. A cylindrical rotating thickening device including an axial core, a shell having a longitudinal dimension and a circumferential dimension, means supporting said shell around said axial core, a perforated deck surrounding and supported on said shell, said deck including a plurality of closely adjacent deck segments extending around said shell in its circumferential direction, and each deck segment including a leading edge and a trailing edge, with one edge of one of said deck segments held against said shell by the next adjacent edge of a following one of said deck segments, wherein said shell has an outer surface including a plurality of longitudinally extending spaced apart grooves, and wherein said deck further includes a bar attached to said leading edge and received in one of said shell grooves, means for securing said leading edge to said bar, and means for securing said bar to said shell.

2. A cylindrical rotating thickening device in accordance with claim 1 wherein said bar is rectangular in cross section, and wherein said shell groove is rectangular in cross section.

3. A cylindrical rotating thickening device in accordance with claim 1 wherein said bar is an integral part of said deck segment leading edge.

4. A cylindrical rotating thickening device in accordance with claim 1 wherein said means for supporting said shell around said axial core is a plurality of longitudinally extending spaced apart support ribs extending radially from said axial core.

5. A cylindrical rotating thickening device including an axial core, a shell having a longitudinal dimension and a circumferential dimension, means supporting said shell around said axial core, a perforated deck surrounding and supported on said shell, said deck including a plurality of closely adjacent deck segments extending around said shell in its circumferential direction, and each deck segment including a leading edge and a trailing edge, with one edge of one of said deck segments held against said shell by the next adjacent edge of a following one of said deck segments, and said leading edge has a lip, and said trailing edge is clamped between said leading edge lip and said shell.

6. A cylindrical rotating thickening device including an axial core, a plurality of longitudinally extending spaced apart support ribs extending radially from said axial core, a shell surrounding said support ribs and supported thereon, said shell having an outer surface including a plurality of longitudinally extending spaced apart grooves, and a perforated deck surrounding and supported on said shell, said deck including a plurality of closely adjacent deck segments, each deck segment including a leading edge and a trailing edge, each of said deck segment trailing edges being clamped against said shell by a following deck segment leading edge, a bar attached to said leading edge and received in said shell groove, said bar being an integral part of said deck segment leading edge, and means for securing said bar to said shell.

7. A cylindrical rotating thickening device in accordance with claim 6 wherein said bar is rectangular in cross section, and wherein said shell groove is rectangular in cross section.

8. A cylindrical rotating thickening device in accordance with claim 6 wherein said leading edge has a lip, and said trailing edge is clamped between said leading edge lip and said shell.

* * * * *